United States Patent
Boland et al.

(10) Patent No.: US 10,286,825 B2
(45) Date of Patent: May 14, 2019

(54) SUPPORT ASSEMBLY FOR A VEHICLE SEAT

(71) Applicant: Ford Global Technologies, LLC, Dearborn, MI (US)

(72) Inventors: Brian Boland, Pinckney, MI (US); Michael Medoro, Livonia, MI (US); Johnathan Andrew Line, Northville, MI (US); S. M. Akbar Berry, Windsor (CA); Michael Kolich, Windsor (CA); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 33 days.

(21) Appl. No.: 15/259,163

(22) Filed: Sep. 8, 2016

(65) Prior Publication Data

US 2018/0065518 A1  Mar. 8, 2018

(51) Int. Cl.
*B60N 2/90* (2018.01)

(52) U.S. Cl.
CPC .............. *B60N 2/99* (2018.02); *B60N 2/914* (2018.02)

(58) Field of Classification Search
CPC ....... B60N 2/4492; B60N 2/4415; B60N 2/62
See application file for complete search history.

(56) References Cited

U.S. PATENT DOCUMENTS

| | | | |
|---|---|---|---|
| 4,522,445 A | 6/1985 | Goldner et al. | |
| 4,589,695 A | 5/1986 | Isono | |
| 4,679,855 A * | 7/1987 | Hattori | B60N 2/4492 297/284.9 |
| 4,707,027 A | 11/1987 | Horvath et al. | |
| 4,856,844 A | 8/1989 | Isono | |
| 4,938,529 A | 7/1990 | Fourrey | |
| 4,965,899 A | 10/1990 | Sekido et al. | |
| 5,082,326 A | 1/1992 | Sekido et al. | |
| 5,096,529 A | 3/1992 | Baker | |
| 5,127,708 A | 7/1992 | Kishi et al. | |
| 5,129,704 A | 7/1992 | Kishi et al. | |
| 5,243,722 A | 9/1993 | Gusakov | |
| 5,280,997 A * | 1/1994 | Andres | A47C 7/467 297/284.6 |
| 5,320,409 A | 6/1994 | Katoh et al. | |

(Continued)

FOREIGN PATENT DOCUMENTS

| | | |
|---|---|---|
| DE | 4403071 A1 | 8/1994 |
| EP | 1839932 A2 | 10/2007 |

(Continued)

OTHER PUBLICATIONS

Recaro GMBH & Co. KG, "Seat Range," ID No. 7218054, Mar. 2010, 21 pages.

(Continued)

*Primary Examiner* — Philip F Gabler
(74) *Attorney, Agent, or Firm* — Vichit Chea; Price Heneveld LLP

(57) ABSTRACT

A support assembly for a vehicle seat includes a base plate and a support plate. The support plate is rotatably coupled to the base plate at a peripheral edge. First and second inflatable members are positioned between the base plate and the support plate. A fluid supply is in fluid communication with the first and second inflatable members.

20 Claims, 9 Drawing Sheets

(56) References Cited

U.S. PATENT DOCUMENTS

| | | | |
|---|---|---|---|
| 5,570,716 A | 11/1996 | Kamen et al. | |
| 5,658,050 A | 8/1997 | Lorbiecki | |
| 5,662,384 A | 9/1997 | O'Neill et al. | |
| 5,707,109 A | 1/1998 | Massara et al. | |
| 5,758,924 A | 6/1998 | Vishey | |
| 5,918,696 A | 7/1999 | Vanvoorhies | |
| 6,068,336 A * | 5/2000 | Schonauer | B60N 2/449 297/284.1 |
| 6,088,642 A | 7/2000 | Finkelstein et al. | |
| 6,203,105 B1 | 3/2001 | Rhodes, Jr. | |
| 6,273,810 B1 | 8/2001 | Rhodes, Jr. et al. | |
| 6,554,365 B2 | 4/2003 | Karschin et al. | |
| 6,629,715 B2 | 10/2003 | Oh et al. | |
| 6,672,666 B2 | 1/2004 | Stiller et al. | |
| 6,682,059 B1 | 1/2004 | Daniels et al. | |
| 6,779,560 B1 | 8/2004 | Reis | |
| 6,802,563 B1 | 10/2004 | Mysliwiec et al. | |
| 6,908,151 B2 | 6/2005 | Meeker et al. | |
| 6,912,748 B2 | 7/2005 | Vansickle | |
| 7,025,423 B2 | 4/2006 | Fujita et al. | |
| 7,055,904 B2 | 6/2006 | Skelly et al. | |
| 7,068,178 B2 | 6/2006 | Oh | |
| 7,125,077 B2 | 10/2006 | Frank | |
| 7,152,920 B2 | 12/2006 | Sugiyama et al. | |
| 7,322,651 B2 | 1/2008 | Makhsous et al. | |
| 7,357,454 B2 | 4/2008 | Schiener et al. | |
| 7,641,281 B2 | 1/2010 | Grimm | |
| 7,909,403 B2 | 3/2011 | Lawall et al. | |
| 7,963,553 B2 | 6/2011 | Huynh et al. | |
| 8,126,615 B2 | 2/2012 | McMillen et al. | |
| 8,231,138 B2 | 7/2012 | Sadr et al. | |
| 8,336,910 B1 | 12/2012 | Kalisz et al. | |
| 8,342,607 B2 | 1/2013 | Hofmann et al. | |
| 8,602,493 B1 | 12/2013 | Chen et al. | |
| 8,678,500 B2 | 3/2014 | Lem et al. | |
| 2003/0023363 A1 | 1/2003 | Katz et al. | |
| 2005/0082895 A1 | 4/2005 | Kimmig | |
| 2005/0179291 A1 | 8/2005 | Brodeur | |
| 2005/0179306 A1* | 8/2005 | White | B60N 2/66 297/452.33 |
| 2006/0043777 A1 | 3/2006 | Friedman et al. | |
| 2006/0152062 A1 | 7/2006 | Archambault et al. | |
| 2006/0214487 A1 | 9/2006 | Holdampf et al. | |
| 2007/0057551 A1* | 3/2007 | Lachenmann | B60N 2/4415 297/284.9 |
| 2007/0118259 A1 | 3/2007 | Chernoff et al. | |
| 2008/0036258 A1 | 2/2008 | Holdampf et al. | |
| 2008/0067850 A1 | 3/2008 | Stenstrom et al. | |
| 2010/0117414 A1 | 5/2010 | Hwang et al. | |
| 2010/0283229 A1 | 11/2010 | Feller et al. | |
| 2010/0319796 A1 | 12/2010 | Whitaker | |
| 2012/0267878 A1 | 10/2012 | Kalisz et al. | |
| 2013/0285426 A1 | 10/2013 | Arant et al. | |
| 2013/0342366 A1 | 12/2013 | Kiefer et al. | |
| 2014/0032043 A1 | 1/2014 | Line et al. | |
| 2014/0333107 A1* | 11/2014 | Seki | B60N 2/62 297/284.1 |
| 2014/0361571 A1 | 12/2014 | Line et al. | |
| 2016/0325799 A1* | 11/2016 | Ogawa | B60N 2/62 |
| 2016/0339814 A1* | 11/2016 | Tanaka | B60N 2/4415 |

FOREIGN PATENT DOCUMENTS

| | | |
|---|---|---|
| GB | 2403139 | 12/2004 |
| JP | 2009096422 A | 5/2009 |
| WO | 2010096307 A1 | 8/2010 |
| WO | 2011068684 A1 | 6/2011 |

OTHER PUBLICATIONS

LEXUS, "The all-new LEXUS 2013", lexus.com P2-332, Feb. 2012, 13 pages.

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/(2 pages).

Frankfurt 2009 Trend—Light and Layered. by Hannah Macmurray, Published in GreenCarDesign, http://www.greencardesign.com/site/trends/00138-frankfurt-2009-trend-light-and-layered), Sep. 2009, 9 pages.

"Imola Pro-fit", Cobra, (https://www.subesports.com/cobra/imola-pro-fit/cob-6000), 2001-2017, 4 pages.

* cited by examiner

SUPPORT ASSEMBLY FOR A VEHICLE SEAT

FIELD OF THE DISCLOSURE

The present disclosure generally relates to a vehicle seat. More specifically, the present disclosure relates to a support assembly for a vehicle seat.

BACKGROUND

Vehicle seats tend to have substantially flat or planar surfaces. These substantially flat or planar surface traditionally lack lateral support for an occupant of the vehicle seat. The lack of lateral support allows a user's weight and body to shift from left to right during vehicle maneuvers.

SUMMARY

According to one aspect of the present disclosure, a support assembly for a vehicle seat includes a base plate and a support plate. The support plate is rotatably coupled to the base plate at a peripheral edge. A fluid supply is in fluid communication with first and second inflatable members. The first and second inflatable members are positioned between the base plate and the support plate. The first and second inflatable members are operably coupled at the peripheral edge.

According to another aspect of the present disclosure, a support assembly for a vehicle seat includes a base plate and a support plate. The support plate is rotatably coupled to the base plate at a peripheral edge. A fluid supply is in fluid communication with first and second inflatable members. The first and second inflatable members are positioned between the base plate and the support plate.

According to yet another aspect of the present disclosure, a support assembly for a vehicle seat includes a base plate and a support plate. The support plate is rotatably coupled to the base plate at a peripheral edge. First and second inflatable members are positioned between the base plate and the support plate. A fluid supply is in fluid communication with the first and second inflatable members.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
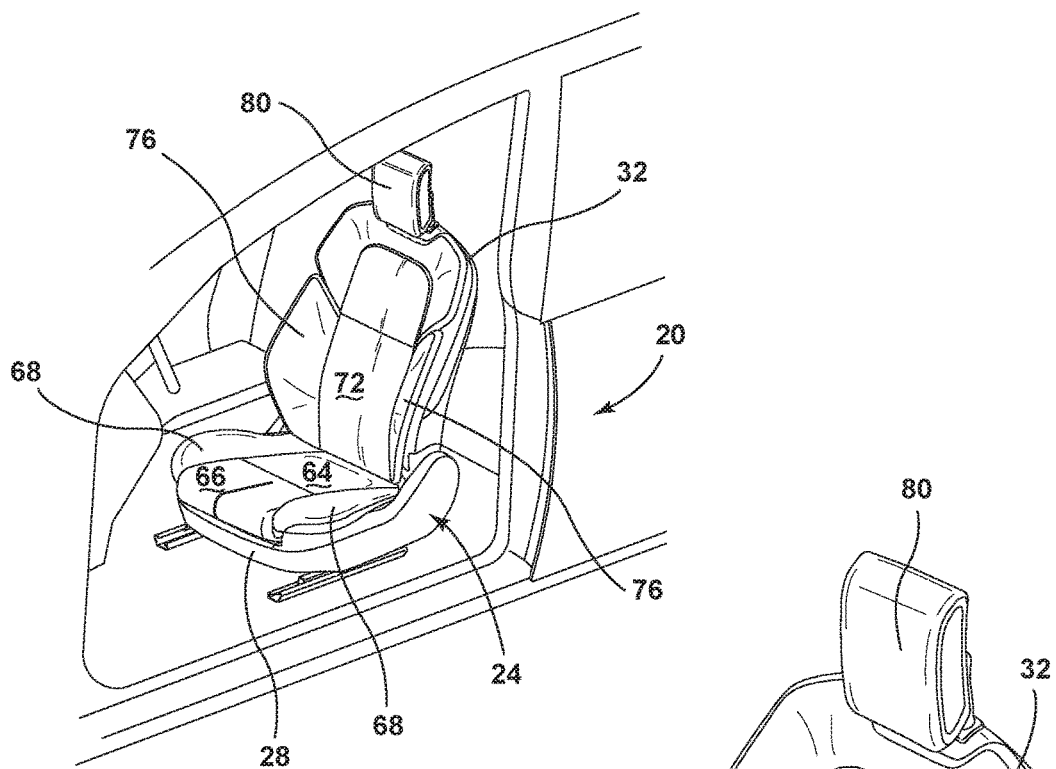
FIG. 1 is a top perspective view of a vehicle seat in a vehicle.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a support assembly for a vehicle seat. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-10, reference numeral 20 generally designates a vehicle. Additionally, a vehicle seat 24 is shown that includes a seat base 28 and a seatback 32. The seat base 28 includes a seat base carrier 36, a seat base ventilation material 38, a seat base cushion 40, a seat base heater mat 42, and a seat base trim 44. Similarly, the seatback 32 includes a seatback carrier 48, a seatback ventilation material 50, a seatback cushion 52, a seatback heater mat 54, and a seatback trim 56. In one embodiment, the vehicle seat 24 includes a support assembly 60 in the seat base 28. The support assembly 60 can be positioned between the seat base carrier 36 and the seat base cushion 40. In another embodiment, the vehicle seat 24 includes the support assembly 60 in the seatback 32. The support assembly 60 can be positioned between the seatback carrier 48 and the seatback cushion 52. In yet another embodiment, the vehicle seat 24 includes the support assembly 60 in both the seat base 28 and the seatback 32. While the support assembly 60 is described as being positioned either between the seat base carrier 36 and the seat base cushion 40 and/or between the seatback carrier 48 and the seatback cushion 52, the support assembly 60 can be alternatively positioned without departing from the concepts disclosed herein.

Figure 2:
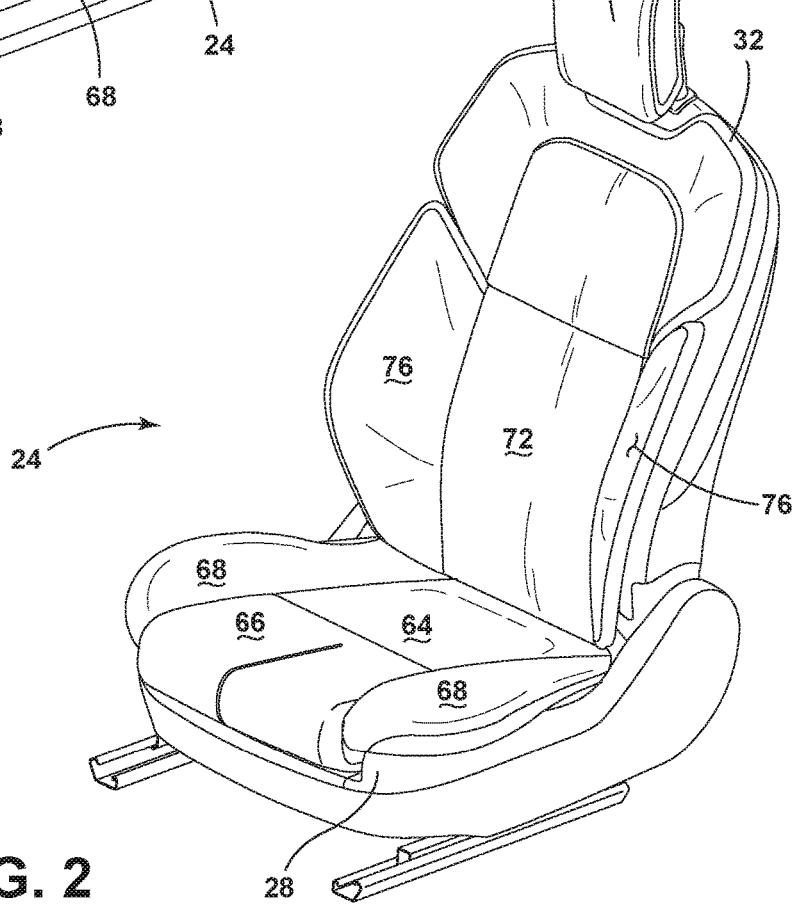
FIG. 2 is a top perspective view of a vehicle seat, similar to FIG. 1, with the vehicle seat removed from the vehicle.

Referring now to FIGS. 1 and 2, the vehicle seat 24 is shown and includes the seat base 28 and the seatback 32. The seat base 28 includes a central seat area 64, a thigh bolster area 66, and seat side bolsters 68. The seatback 32 includes a central seatback area 72, seatback side bolsters 76, and a headrest 80.

Figure 3:
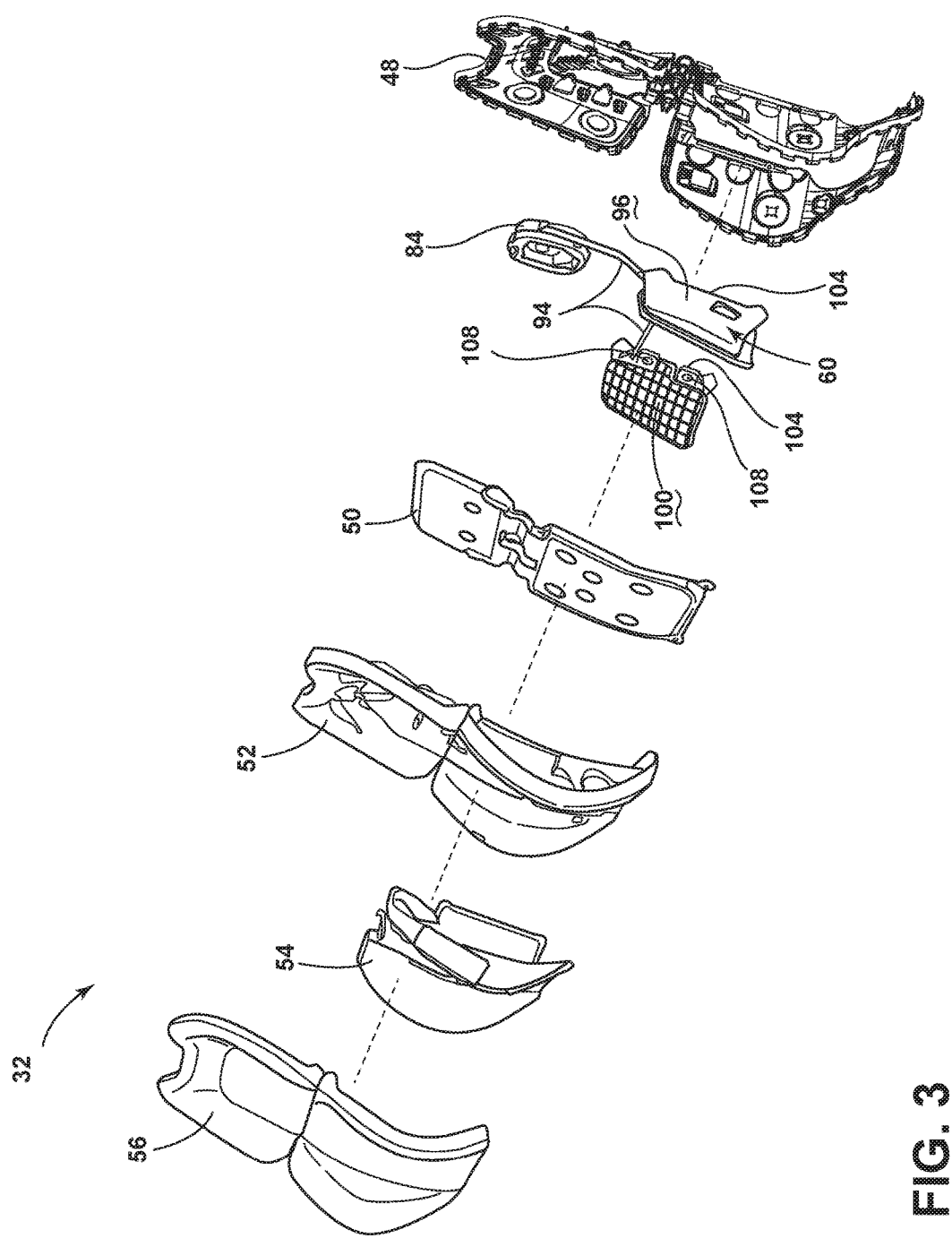
FIG. 3 is an exploded side view of a seatback of the vehicle seat.

Referring to FIG. 3, an exploded view of the seatback 32 is shown. The support assembly 60 can be positioned between the seatback carrier 48 and the seatback cushion 52, according to one embodiment of the present disclosure. More specifically, the support assembly 60 can be positioned between the seatback carrier 48 and the seatback ventilation material 50. Additionally, the support assembly 60 is shown as coupled to a fluid supply 84, such as a fan or pump. The fluid supply 84 can be an air supply; however other pneumatic or hydraulic supplies can be used without departing from the concepts disclosed herein. The fluid supply 84 is in fluid communication with a first inflatable member 88 and a second inflatable member 92 (FIG. 8) of the support assembly 60. The fluid communication between the fluid supply 84 and the first and second inflatable members 88, 92 can be accomplished by a fluid communication member 94, such as tubing. The first inflatable member 88 and the second inflatable member 92 are positioned between a base plate 96 and a support plate 100 of the support assembly 60. The base plate 96 and the support plate 100 are operably coupled at a peripheral edge 104. The coupling of the base plate 96 to the support plate 100 can be accomplished by one or more fasteners. The fasteners that are depicted resemble push pins 108; however one of skill in the art will recognize that other fasteners can be used without departing from the concepts disclosed herein. For example, suitable fasteners include, but are not limited to, screws, bolts, nails, rivets, welding, plastic welding, adhesives, magnets, and the like. The base plate 96 can be made of a non-abrasive material, such as felt, to reduce the risk of puncturing and reduce friction between the first inflatable member 88 and the base plate 96.

Figure 4:
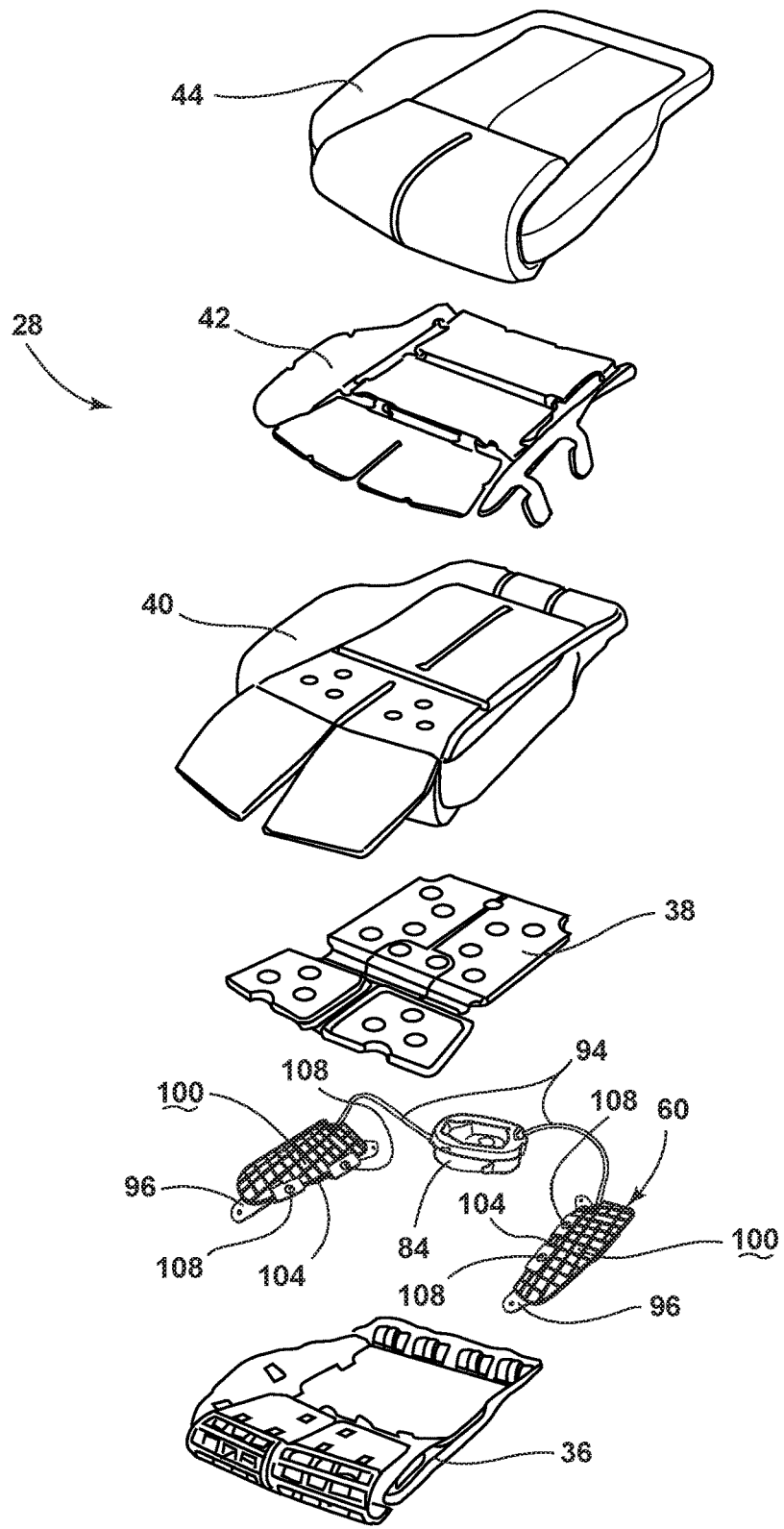
FIG. 4 is an exploded top perspective view of a seat base of the vehicle seat.

Referring now to FIG. 4, an exploded view of the seat base 28 is shown. The support assembly 60 can be positioned between the seat base carrier 36 and the seat base cushion 40, according to one embodiment of the present disclosure. More specifically, the support assembly 60 can be positioned between the seat base carrier 36 and the seat base ventilation material 38. Additionally, the support assembly 60 is shown as coupled to the fluid supply 84, such as a fan or pump. The fluid supply 84 can be an air supply; however other pneumatic or hydraulic supplies can be used without departing from the concepts disclosed herein. The fluid supply 84 is in fluid communication with the first inflatable member 88 and the second inflatable member 92 (FIG. 8) of the support assembly 60. The fluid communication between the fluid supply 84 and the first and second inflatable members 88, 92 can be accomplished by the fluid communication member 94, such as tubing. The first inflatable member 88 and the second inflatable member 92 are positioned between the base plate 96 and the support plate 100 of the support assembly 60. The base plate 96 and the support plate 100 are operably coupled at the peripheral edge 104. The coupling of the base plate 96 to the support plate 100 can be accomplished by one or more fasteners. The fasteners that are depicted resemble push pins 108; however one of skill in the art will recognize that other fasteners can be used without departing from the concepts disclosed herein. For example, suitable fasteners include, but are not limited to, screws, bolts, nails, rivets, welding, plastic welding, adhesives, magnets, and the like.

Figure 5:
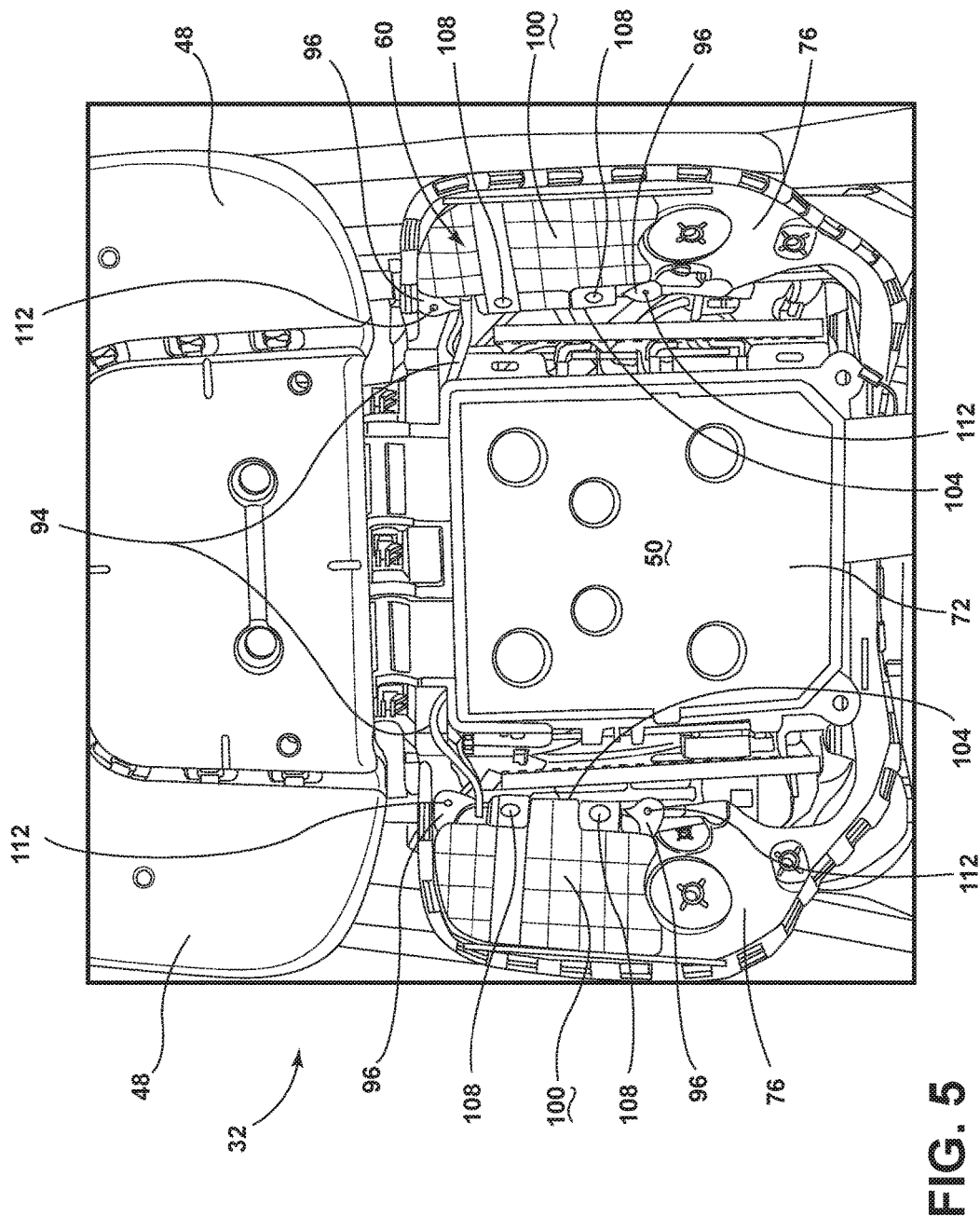
FIG. 5 is a front view of the seatback of the vehicle seat in a partially assembled state, according to one embodiment.

Referring to FIG. 5, one embodiment of the seatback 32 is shown from a front view in a partially assembled state. The support assembly 60 is operably coupled to the seatback carrier 48. The base plate 96, support plate 100, first inflatable member 88, and second inflatable member 92 are positioned on the seatback carrier 48 at the seatback side bolsters 76. The seatback ventilation material 50 overlaps the central seatback area 72 but does not overlap the seatback side bolsters 76. The base plate 96 can be coupled to the seatback carrier 48 by one or more anchors 112. The anchors 112 can be screws, bolts, nails, push pins, rivets, welding, plastic welding, adhesives, magnets, and the like. However, one of skill in the art will recognize that other suitable anchors 112 can be used without departing from the concepts disclosed herein. The base plate 96 is coupled to the support plate 100 by the push pins 108. The push pins 108 can couple the base plate 96 to the support plate 100 without directly coupling the support plate 100 to the seatback carrier 48. Alternatively, the push pins 108 can couple the base plate 96 to the support plate 100 in a manner that directly couples the support plate 100 to the seatback carrier 48. The first and second inflatable members 88, 92 are positioned between the base plate 96 and the support plate 100. The fluid communication member 94 is in fluid communication with at least one of the first and second inflatable members 88, 92. Additionally, the fluid communication member 94 is in fluid communication with the fluid supply 84 (FIG. 3). The fluid supply 84 is positioned between the seatback carrier 48 and the seatback ventilation material 50 at the central seatback area 72.

Figure 6:
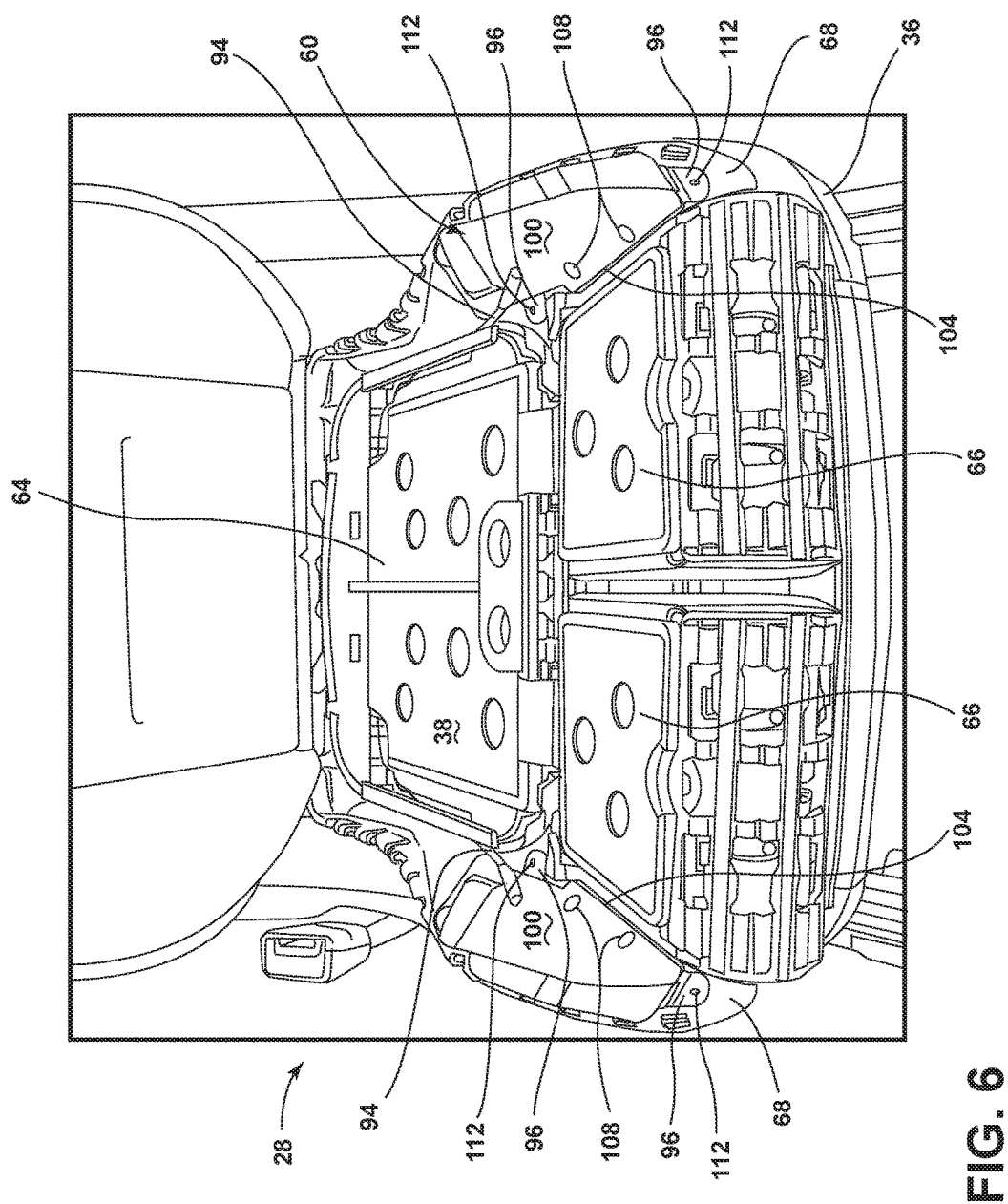
FIG. 6 is a front perspective view of the seat base of the vehicle seat in a partially assembled stated, according to one embodiment.

Referring now to FIG. 6, one embodiment of the seat base 28 is shown from a front perspective view in a partially assembled state. The support assembly 60 is operably coupled to the seat base carrier 36. The base plate 96, support plate 100, first inflatable member 88, and second inflatable member 92 (FIG. 9) are positioned on the seat base carrier 36 at the seat side bolsters 68. The seat base ventilation material 38 overlaps the central seat area 64 but does not overlap the seat side bolsters 68. The base plate 96 can be coupled to the seat base carrier 36 by one or more anchors 112. The anchors 112 can be screws, bolts, nails, push pins, rivets, welding, plastic welding, adhesives, magnets, and the like. However, one of skill in the art will recognize that other suitable anchors 112 can be used without departing from the concepts disclosed herein. The base plate 96 is coupled to the support plate 100 by the push pins 108. The push pins 108 can couple the base plate 96 to the support plate 100 without directly coupling the support plate 100 to the seat base carrier 36. Alternatively, the push pins 108 can couple the base plate 96 to the support plate 100 in a manner that directly couples the support plate 100 to the seat base carrier 36. The first and second inflatable members 88, 92 are positioned between the base plate 96 and the support plate 100. The fluid communication member 94 is in fluid communication with at least one of the first and second inflatable members 88, 92. Additionally, the fluid communication member 94 is in fluid communication with the fluid supply 84 (FIG. 4). The fluid supply 84 is positioned between the seat base carrier 36 and the seat base ventilation material 38 at the central seat area 64.

Figure 7:
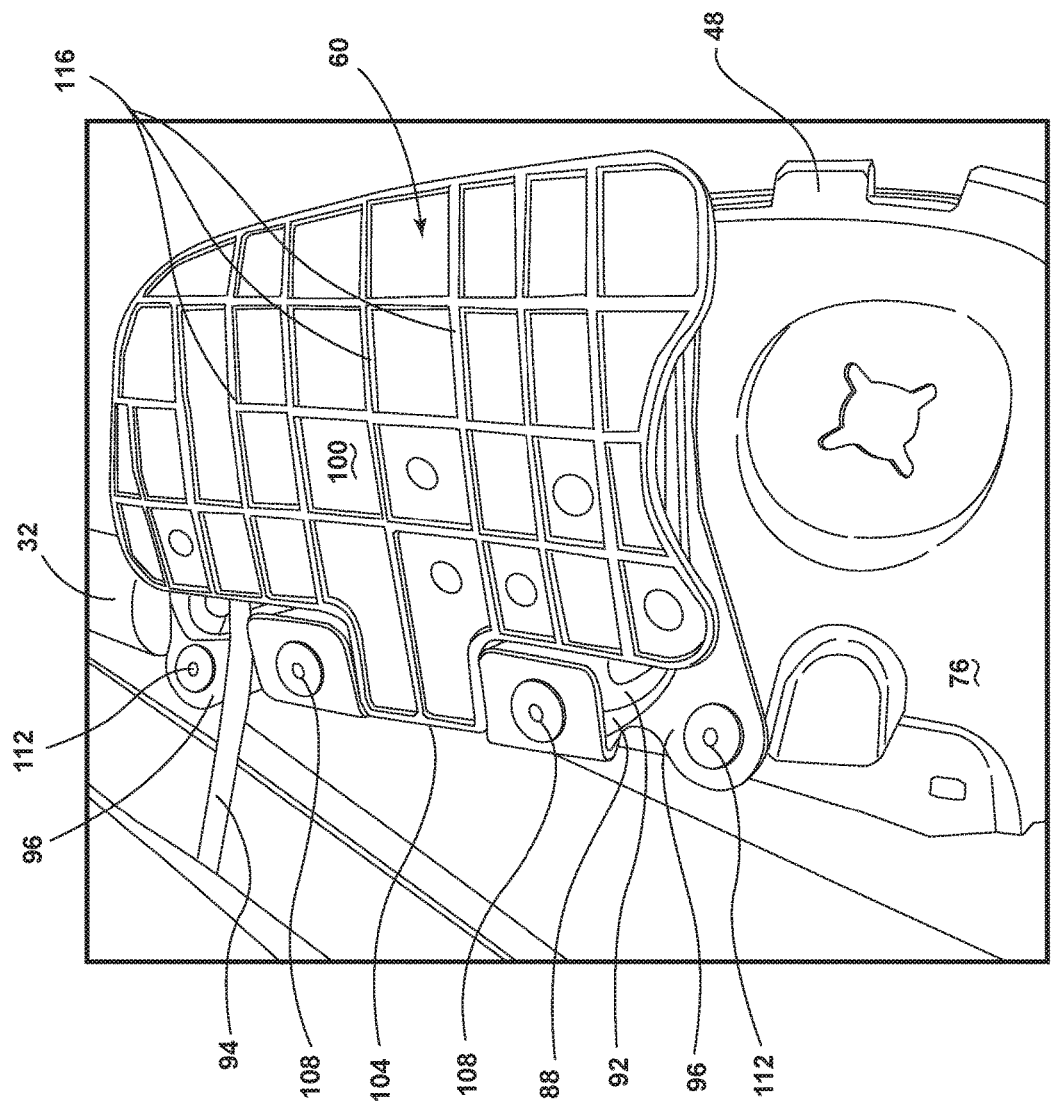
FIG. 7 is a top perspective view of a first position of one embodiment of a support assembly coupled to a seatback carrier of the vehicle seat.

Referring to FIG. 7, a top perspective view of one embodiment is shown of the support assembly 60 coupled to the seatback carrier 48 by anchors 112. The support assembly 60 is shown in a first position with the first and second inflatable members 88, 92 deflated. The base plate 96 and the support plate 100 are operably coupled at the peripheral edge 104 by the push pins 108. The support plate 100 is made of a flexible but semi-rigid material, such as a polymer or polymeric material. The flexible, semi-rigid material improves the load distribution of the support plate 100 and decreases the local pressure on the user, which results in fewer pressure points and less concentrated load support. Additionally, the support plate 100 can include a series of raised structures 116 that improve the load distribution, rigidity, and durability of the support plate 100. The fluid communication member 94 is in fluid communication with the first and second inflatable members 88, 92. The support assembly 60 is located at the seatback side bolsters 76 of the seatback carrier 48. While shown as the right hand side of the seatback 32 (left hand side if occupying the seatback 32), one of skill in the art will recognize that the left hand side of the seatback 32 can additionally or alternatively include the support assembly 60. As shown in FIG. 5 the support assembly 60 can be located on either side of the seatback 32 with the difference between the support assemblies 60 being that they are mirror images of one another.

Figure 8:
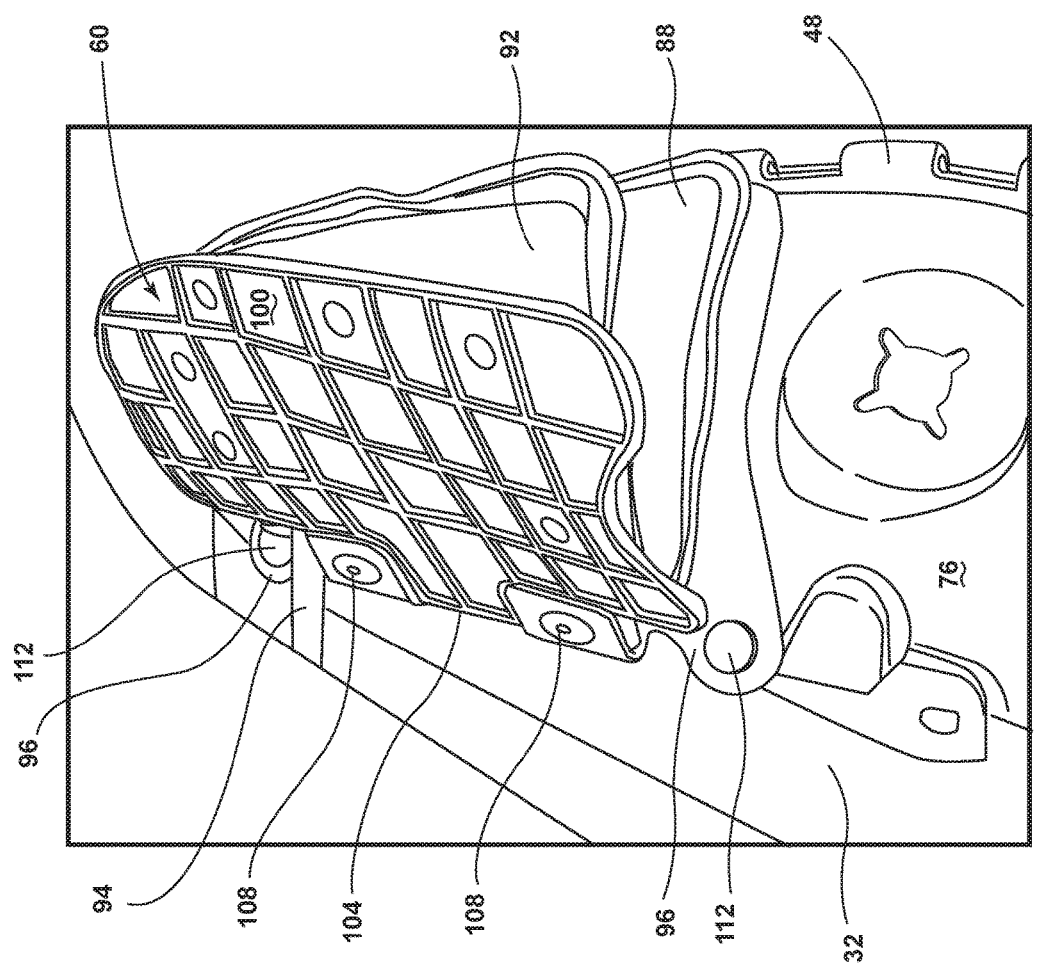
FIG. 8 is a top perspective view of a second position of one embodiment of the support assembly coupled to the seatback carrier of the vehicle seat, similar to FIG. 7.

Referring now to FIG. 8, a top perspective view of one embodiment of the support assembly 60 is shown coupled to the seatback carrier 48 by anchors 112, similar to FIG. 7. The support assembly 60 is shown in a second position with the first and second inflatable members 88, 92 at least partially inflated. The first and second inflatable members 88, 92 can be heat staked within the support assembly 60. Alternatively, the first and second inflatable members 88, 92 can be mechanically fastened in place. The base plate 96 and the support plate 100 are operably coupled at the peripheral edge 104 by the push pins 108. Coupling the base plate 96 and the support plate 100 at the peripheral edge 104 enables the support assembly 60 to open in a clamshell-like manner. Opening in the clamshell-like manner provides superior side bolster articulation, which can give a user of the vehicle seat 24 more support, a custom-feeling fit, and improved lateral support during vehicle 20 maneuvers.

Figure 9:
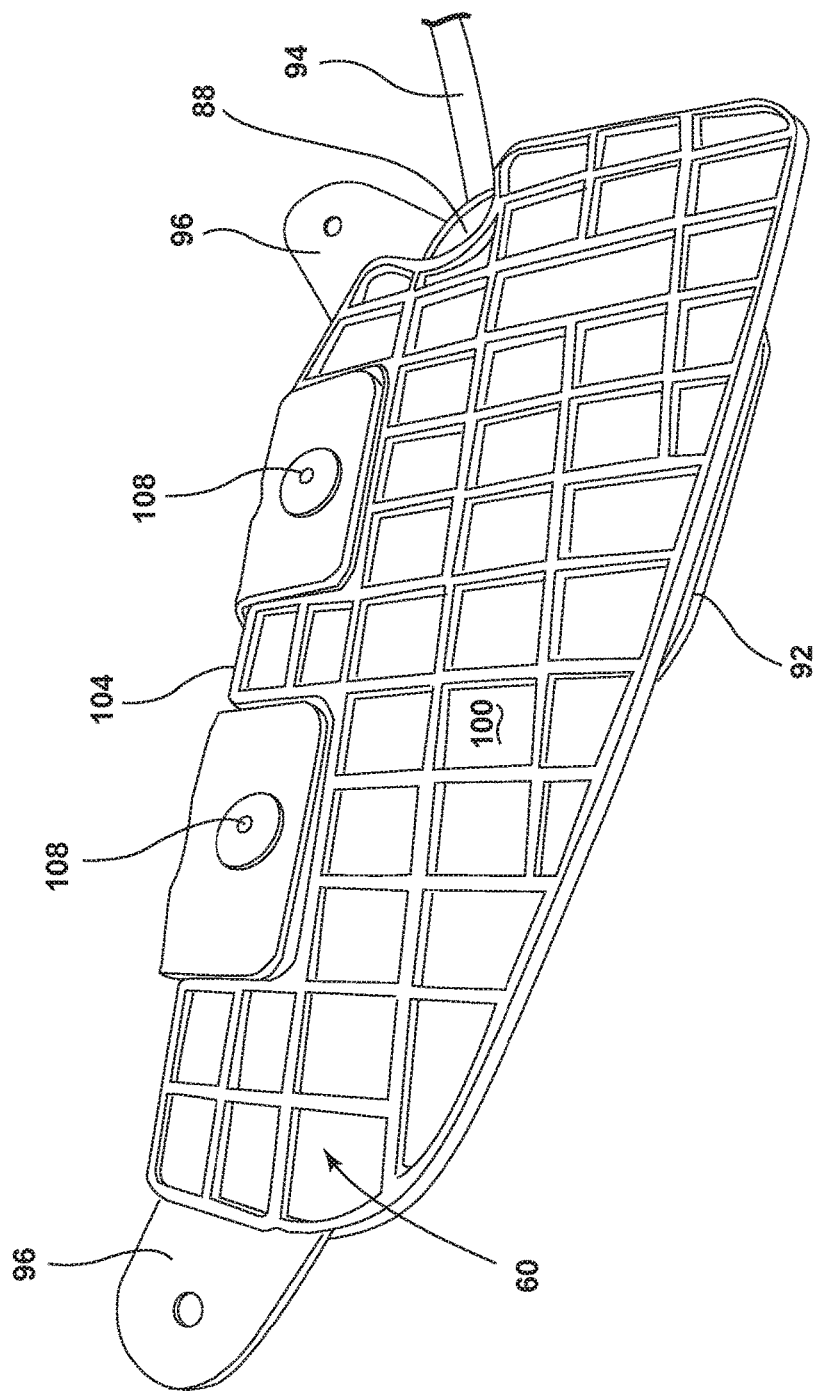
FIG. 9 is a top perspective view of another embodiment of the support assembly.

Referring to FIG. 9, a top perspective view is shown of another embodiment of the support assembly 60. The support assembly 60 is shown in a first position with the first and second inflatable members 88, 92 deflated. The base plate 96 and the support plate 100 are operably coupled at the peripheral edge 104 by the push pins 108. The fluid communication member 94 is in fluid communication with the first and second inflatable members 88, 92. The support assembly 60 can be located at the seat side bolsters 68 of the seat base carrier 36. While shown as contoured for the right hand side of the seat base 28 (left hand side if occupying the seat base 28), one of skill in the art will recognize that the left hand side of the seat base 28 can additionally or alternatively include the support assembly 60. As shown in FIG. 6 the support assembly 60 can be located on either side of the seat base 28 with the difference between the support assemblies 60 being that they are mirror images of one another.

Figure 10:
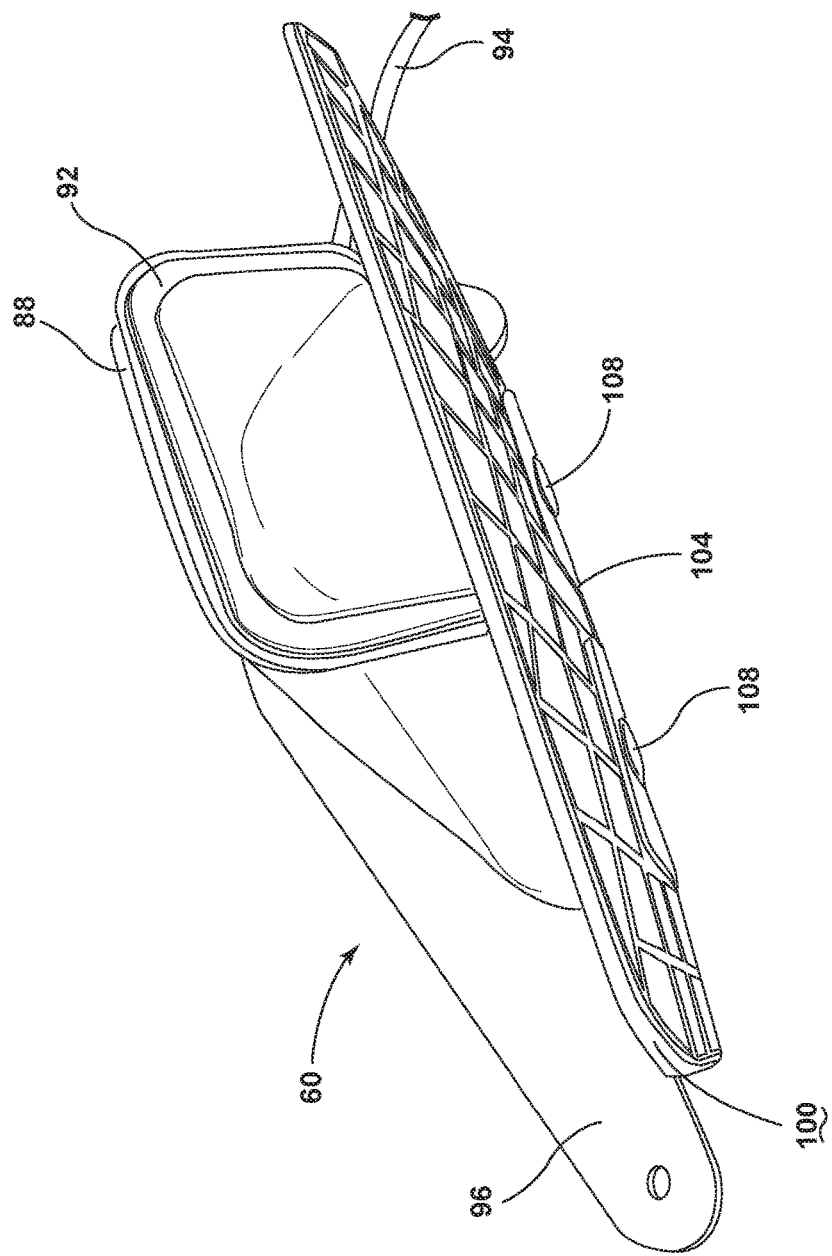
FIG. 10 is a top perspective view, similar to FIG. 9, of the support assembly with a support plate raised to expose the interior of the support assembly.

Referring now to FIG. 10, a top perspective view, similar to FIG. 9, of the support assembly 60 is shown with the support plate 100 raised to expose the interior of the support assembly 60. The components of the support assembly 60 are common between the different embodiments (i.e. the first inflatable member 88, the second inflatable member 92, the fluid communication member 94, the base plate 96, and the support plate 100). It is worthwhile to note that the general shape of the support assembly 60 can vary without departing from the concepts contained in this disclosure. Preferably, the general shape of the support assembly 60 substantially resembles the shape of the component that will be acted on as a result of the articulation of the support plate 100. As can be seen in FIGS. 5 and 6, the support assemblies 60 substantially resemble the seat side bolsters 68 and the seatback side bolsters 76, respectively. Additionally, as seen in FIG. 8, the first and second inflatable members 88, 92 can substantially resemble the surface area of the support plate 100. Alternatively, as seen in FIG. 10, the first and second inflatable members 88, 92 need not substantially resemble the surface area of the support plate 100.

Vehicle seats 24 traditionally lack distributed lateral thigh and torso support. This lack of lateral support allows the user of the vehicle seat 24 to move or slide in the vehicle seat 24 during vehicle 20 maneuvers. More specifically, during hard left or hard right turns, the user's weight can shift from right to left as a result of the vehicle 20 maneuvers. Moreover, vehicle seats 24 are generally not as comfortable as other furniture, such as a couch, chair, or other living room furniture. The lack of comfort and security in the vehicle seat 24 can be due, at least in part, to the substantially flat surface of the vehicle seat 24. Some vehicle seats 24 attempt to remedy these shortcomings by providing rigid lateral support. However, these solutions are not desirable as they create pressure points of concentrated pressure on the user's body. The present disclosure provides the vehicle seat 24 with the seat side bolsters 68 and the seatback side bolsters 76 as having superior load distribution properties that make the vehicle seat 24 more comfortable and secure.

Additionally, the support assembly 60 of the vehicle seat 24 opens in a clamshell-like manner. By opening in a clamshell-like manner the support assembly 60 comes out to "meet" the user and provides a custom-fit support arrangement for the user of the vehicle seat 24. Side bolsters that do not inflate in a clamshell-like manner generally provide a somewhat contoured surface but do not provide active and comfortable pressure to the sides of the user. However, the support assembly 60 of the present disclosure provides active, comfortable, and distributed pressure to the user of the vehicle seat 24, such that they are held securely in place during vehicle 20 maneuvers without creating concentrated pressure points. More specifically, the active, comfortable, and distributed pressure felt by the user of the support assembly 60 of the present disclosure retains the user securely in the vehicle seat 24 in a lateral direction during hard left and hard right turns.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A support assembly for a vehicle seat comprising:
a base plate;
a support plate operably coupled to the base plate at a peripheral edge; and
a fluid supply positioned between a ventilation material and a carrier of the vehicle seat, the fluid supply in fluid communication with first and second inflatable members positioned between the base plate and the support plate, the first and second inflatable members being independently inflatable by the fluid supply.

2. The support assembly for a vehicle seat of claim 1, wherein the first and second inflatable members articulate the support plate in a clamshell-like manner.

3. The support assembly for a vehicle seat of claim 1, wherein the base plate and the support plate are positioned between a seat base carrier and a seat base cushion of the vehicle seat.

4. The support assembly for a vehicle seat of claim 3, wherein the base plate and the support plate are operably coupled to the seat base carrier at the peripheral edge.

5. The support assembly for a vehicle seat of claim 1, wherein the base plate is made of a non-abrasive material.

6. The support assembly for a vehicle seat of claim 5, wherein the non-abrasive material is felt.

7. The support assembly for a vehicle seat of claim 1, wherein the support plate comprises a generally planar surface with a series of raised structures vertically protruding therefrom.

8. A support assembly for a vehicle seat comprising:
a base plate;
a support plate rotatably coupled to the base plate at a peripheral edge; and
a fluid supply coupled to a ventilation material and in fluid communication with first and second inflatable members positioned between the base plate and the support plate, wherein the first and second inflatable members articulate the support plate in a clamshell-like manner.

9. The support assembly for a vehicle seat of claim 8, wherein the support plate comprises a generally planar surface with a series of raised structures vertically protruding therefrom.

10. The support assembly for a vehicle seat of claim 8, wherein the first inflatable member and the second inflatable member are independently inflatable by the fluid supply.

11. The support assembly for a vehicle seat of claim 8, wherein the base plate and the support plate are positioned between a seatback carrier and a seatback cushion of the vehicle seat.

12. The support assembly for a vehicle seat of claim 11, wherein the base plate and the support plate are operably coupled to the seatback carrier at the peripheral edge.

13. The support assembly for a vehicle seat of claim 8, wherein the base plate is made of a non-abrasive material.

14. The support assembly for a vehicle seat of claim 13, wherein the non-abrasive material is felt.

15. The support assembly for a vehicle seat of claim 8, wherein the support plate is made of a polymeric material.

16. A support assembly for a vehicle seat comprising:
a base plate and a support plate rotatably coupled at a peripheral edge, the support plate comprising a generally planar surface with a series of raised structures protruding vertically therefrom;
first and second inflatable members adjacently located between the base plate and the support plate on one lateral side of the vehicle seat; and
a fluid supply in fluid communication with the first and second inflatable members, the fluid supply coupled to a ventilation material.

17. The support assembly for a vehicle seat of claim 16, wherein the fluid supply ventilates the vehicle seat and supplies fluid to the first and second inflatable members.

18. The support assembly for a vehicle seat of claim 16, wherein the first inflatable member and the second inflatable member are independently inflatable by the fluid supply.

19. The support assembly for a vehicle seat of claim 16, wherein the first inflatable member and the second inflatable member are configured to articulate the support plate between a first position and a second position in a clamshell-like manner.

20. The support assembly for a vehicle seat of claim 19, wherein the base plate and the support plate are positioned between a carrier and a cushion of said vehicle seat.

\* \* \* \* \*